United States Patent
Murphy

(10) Patent No.: US 8,737,688 B2
(45) Date of Patent: May 27, 2014

(54) TARGETED CONTENT ACQUISITION USING IMAGE ANALYSIS

(76) Inventor: William A. Murphy, Los Altos, CA (US)

( * ) Notice: Subject to any disclaimer, the term of this patent is extended or adjusted under 35 U.S.C. 154(b) by 156 days.

(21) Appl. No.: 13/369,638

(22) Filed: Feb. 9, 2012

(65) Prior Publication Data

US 2012/0207349 A1    Aug. 16, 2012

Related U.S. Application Data

(60) Provisional application No. 61/441,432, filed on Feb. 10, 2011.

(51) Int. Cl.
*G06K 9/00* (2006.01)

(52) U.S. Cl.
USPC .......................................... 382/103

(58) Field of Classification Search
None
See application file for complete search history.

(56) References Cited

U.S. PATENT DOCUMENTS

| 7,382,244 | B1 | 6/2008 | Donovan et al. |
| 7,917,853 | B2 * | 3/2011 | Trauth ........................... 715/733 |
| 8,290,999 | B2 * | 10/2012 | Shepherd et al. ............. 707/728 |
| 2006/0195569 | A1 | 8/2006 | Barker |
| 2007/0013776 | A1 | 1/2007 | Venetianer et al. |
| 2007/0172155 | A1 * | 7/2007 | Guckenberger ............... 382/305 |
| 2008/0108339 | A1 | 5/2008 | Shaffer et al. |
| 2009/0141993 | A1 | 6/2009 | Ma et al. |
| 2009/0245573 | A1 | 10/2009 | Saptharishi et al. |
| 2010/0177938 | A1 * | 7/2010 | Martinez et al. .............. 382/118 |
| 2010/0191827 | A1 * | 7/2010 | Martin .......................... 709/217 |
| 2011/0022529 | A1 * | 1/2011 | Barsoba et al. ............... 705/319 |
| 2011/0112899 | A1 * | 5/2011 | Strutton et al. ............. 705/14.41 |
| 2011/0143728 | A1 * | 6/2011 | Holopainen et al. ........ 455/414.1 |
| 2011/0211764 | A1 * | 9/2011 | Krupka et al. ................. 382/225 |

FOREIGN PATENT DOCUMENTS

| WO | 2008092255 A1 | 8/2008 |
| WO | 2008154003 A2 | 12/2008 |

* cited by examiner

*Primary Examiner* — Atiba O Fitzpatrick
*Assistant Examiner* — Thomas A James
(74) *Attorney, Agent, or Firm* — The Law Office of Michael E. Kondoudis

(57) ABSTRACT

A method is provided in which a tag is affixed to a known individual that is to be identified within a known field of view of an image capture system. The tag is a physical tag comprising at least a known feature. Subsequent to affixing the tag to the known individual, image data is captured within the known field of view of the image capture system, which is then provided to a processor. Image analysis is performed on the captured image data to detect the at least a known feature. In dependence upon detecting the at least a known feature, an occurrence of the known individual within the captured image data is identified.

7 Claims, 5 Drawing Sheets

TARGETED CONTENT ACQUISITION USING IMAGE ANALYSIS

CROSS-REFERENCE TO RELATED APPLICATION

This application claims the benefit of U.S. Provisional Application No. 61/441,432, filed Feb. 10, 2011.

FIELD OF THE INVENTION

The instant invention relates generally to image analysis, and more particularly to targeted content acquisition using image analysis.

BACKGROUND OF THE INVENTION

Social network applications commonly refer to applications that facilitate interaction of individuals through various websites or other Internet-based distribution of content. In most social network applications a user can create an account and provide various types of content specific to the individual, such as pictures of the individual, their friends, their family, personal information in text form, favorite music or videos, etc. The content is then made available to other users of the social network application. For example, one or more web pages may be defined for each user of the social network application that can be viewed by other users of the social network application. Also, social network applications typically allow a user to define a set of "friends," "contacts" or "members" with whom the respective user wishes to communicate repeatedly. In general, users of a social network application may post comments or other content to portions of each other's web pages.

Typically, the user's content is updated periodically to reflect the most recent or most significant occurrences in the user's life. This process involves selecting new content, editing the presentation of the existing content within one or more web pages to include the selected new content, and uploading any changes to a social network server. Of course, often it is not convenient to update content on a social network site while an event or social function is still occurring. As a result, the user's "friends" are unable to view content relating to the event or social function until some time after the event or social function has ended. The inability to interact with the user in real time, via the social networking site, may increase the feeling of alienation that the user's "friends" experience due to being unable to attend the event or social function in person. Furthermore, depending on the user's dedication to maintaining a current profile, significant time may elapse between the end of an event or social function and updating of the profile. Unfortunately, it is often the case that the "real-time value" of the captured image is lost. As a result, the user's "friends" do not realize that a particular person has entered a party or a bar, or that a beautiful sunset is occurring, etc., until after it is too late to act on that information.

It is also a common occurrence for users of social network applications to neglect to capture images during events or social functions, or to capture images that are of poor quality, etc. The user may discover after the fact that they do not have suitable images of certain people that they would like to feature in the updated content relating to a particular event or social function. At the same time, the user may inadvertently have captured images of individuals who object to being depicted on social network sites. For these reasons, even if the user is dedicated to maintaining a current profile, the result tends to be less that optimal.

Of course, images are captured for a variety of reasons other than for populating social network web pages. For instance, images are typically captured for reasons associated with security and/or monitoring. By way of a specific and non-limiting example, a parent may wish to monitor the movements of a young child within an enclosed area that is equipped with a camera system. When several children are present within the enclosed area, the captured images are likely to include images of at least some of the other children, and as a result the young child may be hidden in some of the images. Under such conditions, the parent must closely examine each image to pick out the young child that is being monitored. Another example relates to the tracking of objects in storage areas or transfer stations, etc.

Complex matching and object identification methods are known for tracking the movement of objects, such as is described in United States Patent Application Publication 2009/0245573 A1, the entire contents of which are incorporated herein by reference. Image data captured in multiple fields of view are analyzed to detect objects, and a signature of features is determined for the objects that are detected in each field of view. Via a learning process, the system compares the signatures for each of the objects to determine if the objects are multiple occurrences of the same object. Unfortunately, the system must be trained in a semi-manual fashion, and the training must be repeated for every classification of object that is to be analyzed.

It would be advantageous to provide a method and system that overcomes at least some of the above-mentioned limitations.

SUMMARY OF EMBODIMENTS OF THE INVENTION

In accordance with an aspect of the invention there is provided a method comprising: affixing a tag to a known individual that is to be identified within a known field of view of an image capture system, the tag comprising at least a known feature; subsequent to affixing the tag to the known individual, capturing image data within the known field of view of the image capture system; providing the captured image data from the image capture system to a processor; using the processor, performing image analysis on the captured image data to detect the at least a known feature; and, in dependence upon detecting the at least a known feature, identifying an occurrence of the known individual within the captured image data.

In accordance with an aspect of the invention there is provided a method comprising: providing a tag comprising at least a known feature, the tag having associated therewith a defined image-forwarding rule; affixing the tag to a known individual that is to be identified within a known field of view of an image capture system; subsequent to affixing the tag to the known individual, capturing image data within the known field of view of the image capture system; performing image analysis on the captured image data to detect the at least a known feature of the tag; and, in dependence upon detecting the at least a known feature of the tag within the captured image data, forwarding the captured image data in accordance with the defined image-forwarding rule.

In accordance with an aspect of the invention there is provided a method comprising: affixing a first tag to a first known individual and affixing a second tag to a second known individual, the first tag comprising a uniquely identifiable first feature and the second tag comprising a uniquely identifiable second feature, and each one of the first tag and the second tag having associated therewith a predetermined image-forwarding rule; subsequent to affixing the first tag to the first known individual and affixing the second tag to the second known individual, capturing image data within a known field of view of an image capture system; using image analysis, identifying within the captured image data the first tag and the second tag, based on the uniquely identifiable first feature and the uniquely identifiable second feature, respectively; and, processing the captured image data in accordance with the image-forwarding rule associated with the first tag and the image-forwarding rule associated with the second tag.

In accordance with an aspect of the invention there is provided a system comprising: an image capture system for capturing image data within a known field of view; a tag comprising a known feature, the tag for being affixed to a known individual that is to be identified; and, a processor in communication with the image capture system for receiving image data from the image capture system and for performing image analysis on the image data to identify the known feature of the tag within the image data.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
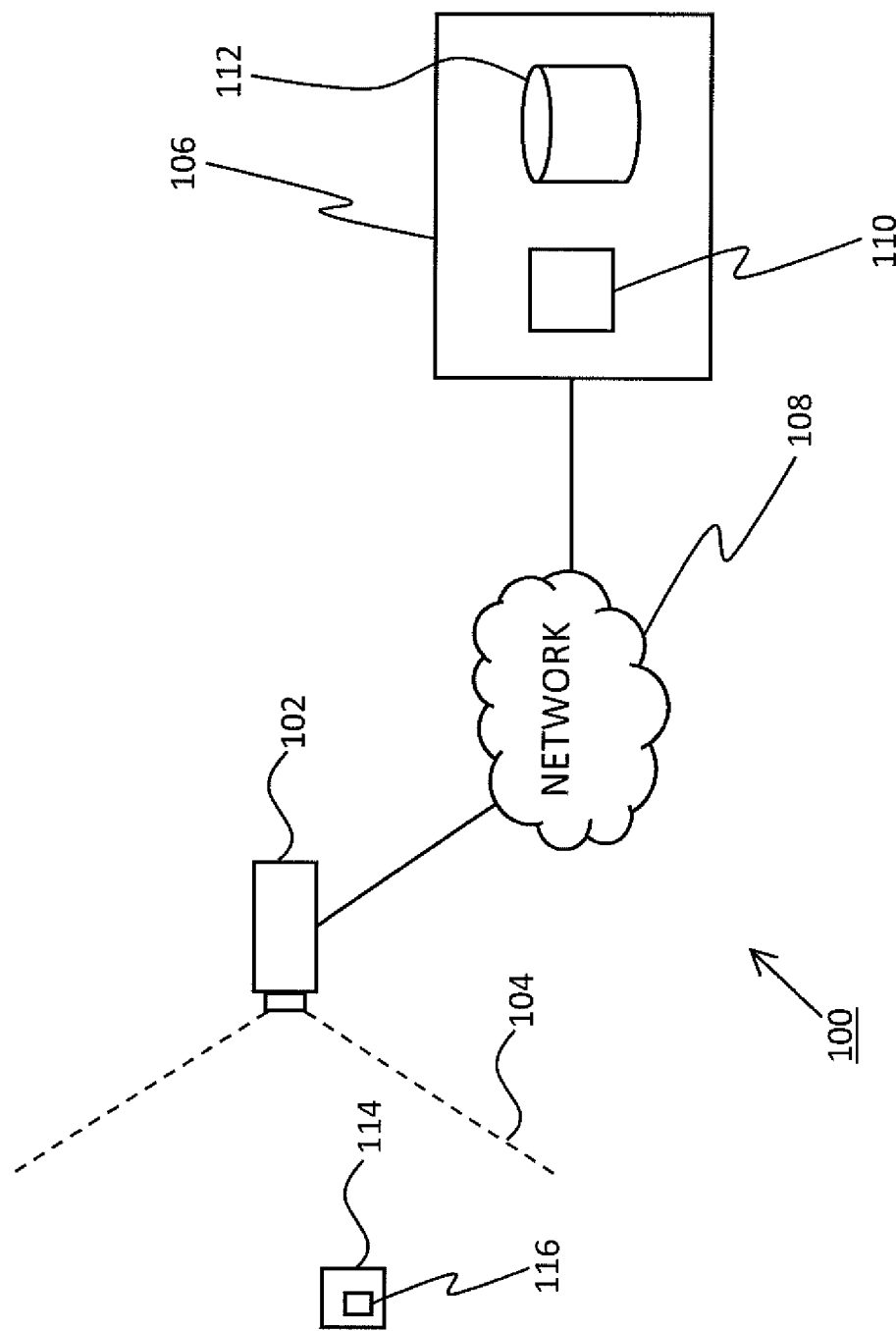
FIG. 1 is a schematic block diagram of a system according to an embodiment of the instant invention.

FIG. 1 is a simplified block diagram of a system according to an embodiment of the instant invention. The system 100 comprises an image capture system comprising a camera 102 for capturing image data within a known field of view (FOV) 104. The system 100 further comprises a server 106 that is remote from the camera 102, and that is in communication with the camera 102 via a communication network 108, such as for instance a wide area network (WAN). The server 106 comprises a processor 110 and a data storage device 112. Additionally, the system 100 comprises a tag 114 having a known feature 116. The tag 114 has associated therewith a defined image-forwarding rule. The defined image-forwarding rule is retrievably stored in the data storage device 112, in association with an identifier of the tag.

Optionally, the camera 102 is one of a video camera that captures images substantially continuously, such as for instance at a frame rate of between 5 frames per second (fps) and 30 fps, and a "still" camera that capture images at predetermined intervals of time or in response to an external trigger. Some specific and non-limiting examples of suitable external triggers include detection of motion within the camera FOV 104, detection of infrared signal and resulting triggering of light, and user-initiated actuation of an image capture system.

During use, the tag 114 is affixed to an individual that is to be identified within the known FOV 104. For instance, the tag 114 is affixed to a known human subject. Camera 102 captures image data within the known FOV 104 and provides the captured image data to the processor 110 of server 106 via the network 108. Using the processor 110, an image analysis process is applied to the captured image data for detecting therein the known feature 116 of the tag 114. When the captured image data comprises a stream of video data, then the image analysis is video analytics, performed in dependence upon a image data of a plurality of frames of the video data stream. When the image analysis process detects the known feature 116 of the tag 114 in the captured image data, the image-forwarding rule associated with the tag 114 is retrieved from the data storage device 112. The captured image data is then processed according to the image-forwarding rule.

In a first specific and non-limiting example, the image-forwarding rule includes a destination and an authorization for forwarding to the destination the captured image data including the known feature 116 of the tag 114. In this case, the human subject does not object to being represented in the image data that is provided to the destination, which is for instance a social networking application or another publicly accessible destination.

In a second specific and non-limiting example, the image-forwarding rule includes a forwarding criterion. For instance, the forwarding criterion comprises a time delay between capturing the image data and forwarding the image data to the destination. In this case, the human subject does not object to being represented in image data that is provided to the destination, which is for instance a social networking application or another publicly accessible destination. The human subject does however require a time delay between capturing the image data and making the image data publicly available. In this way, a celebrity such as an actor, a sports figure or a political figure may be given sufficient time to leave a particular area before the images showing the celebrity in that area become publicly available. Thus, a restaurant or another venue may provide the celebrity with a physical tag upon arrival, and capture promotional images while the celebrity is present. The captured images are either stored locally or provided to the destination but not made publicly accessible until after the end of the specified time delay. In this case, the restaurant or other venue is able to provide the promotional images for public viewing in a timely manner, while at the same time respecting the privacy of the celebrity. Alternatively, the time delay allows the human subject or another entity to approve/modify/reject placement of the images on the social networking application or other publicly accessible destination. In this way, unflattering images or images showing inappropriate social behavior may be removed.

In a third specific and non-limiting example, the image-forwarding rule comprises a forwarding denial instruction. In this case, the human subject objects to being represented in image data that is provided to the destination, which is for instance a social networking application or another publicly accessible destination. When the image-forwarding rule comprises a forwarding denial instruction, image data containing the human subject is not forwarded to a destination, such as for instance a social networking application.

Of course, other image-forwarding rules may be associated with tag 114. In addition, the system that is shown in FIG. 1 may be used in connection with other applications, such as for instance security monitoring. In this case, a tag is provided to an authorized individual, such as for instance a security guard or a building tenant. When the tag is identified within captured image data, based on a known feature thereof, a defined image-forwarding rule associated with the tag specifies that the captured image data is not to be provided to a security center as part of an alert. Optionally, the image-forwarding rule specifies additional criteria, such as for instance time periods during which the wearer of the tag is authorized to be within the monitored area. In the event that camera 102 captures an image of the wearer of the tag outside of the authorized time periods, an alert may be sent to the security center.

In an alternative embodiment, camera 102 is edge device and includes an on-board image analysis processor and a memory for storing image-forwarding rules in association with an indicator of the tag 114. Optionally, the on-board image analysis processor performs image analysis, such as for instance video analytics processing, to detect the known feature 116 of the tag 114 therein, and then processes the captured image data in accordance with the defined image-forwarding rule.

Figure 2:
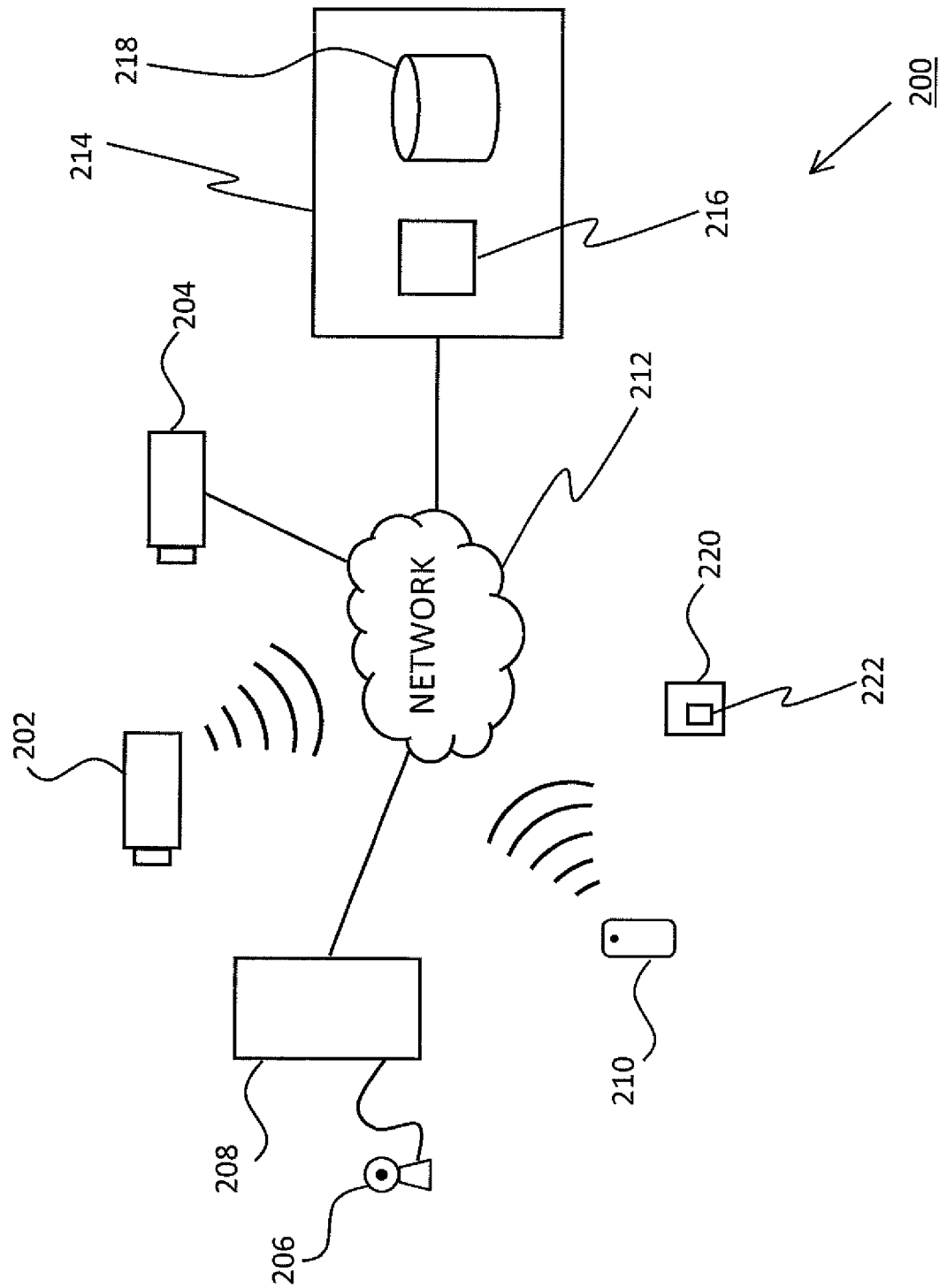
FIG. 2 is a schematic block diagram of another system according to an embodiment of the instant invention.

FIG. 2 is a simplified block diagram of another system according to an embodiment of the instant invention. The system 200 comprises a plurality of cameras, such as for instance a first network camera 202, a second network camera 204, a "web cam" 206 associated with a computer 208, and a camera phone 210. Each camera 202, 204, 206 and 210 of the plurality of cameras is associated, at least temporarily, with a first user. For instance, in the instant example the first network camera 202, the second network camera 204 and the "web cam" 206 belong to a first user and are disposed within the first user's location, whereas the camera phone 210 belongs to a second user who is at the first user's location only temporarily. Optionally, some cameras of the plurality of cameras are stationary, such as for instance the second network camera 204 and the "web cam" 206, whilst other cameras of the plurality of cameras are either mobile or repositionable (pan/tilt/zoom, etc.), such as for instance the camera phone 210 and the first network camera 202, respectively. Further optionally, the plurality of cameras includes video cameras that capture images substantially continuously, such as for instance at a frame rate of between 5 frames per second (fps) and 30 fps, and/or "still" cameras that capture images at predetermined intervals of time or in response to an external trigger. Some specific and non-limiting examples of suitable external triggers include detection of motion within the camera field of view (FOV) and user-initiated actuation of an image capture system.

Each camera 202, 204, 206 and 210 of the plurality of cameras is in communication with a communication network 212 via either a wireless network connection or a wired network connection. In an embodiment, the communication network 212 is a wide area network (WAN) such as the Internet. Optionally, the communication network 212 includes a local area network (LAN) that is connected to the WAN via a not illustrated gateway. Further optionally, the communication network 212 includes a cellular network.

During use, the plurality of cameras 202, 204, 206 and 210 capture image data relating to individuals or other features within the respective FOV of the different cameras. When the plurality of cameras 202, 204, 206 and 210 are separated spatially one from another, for instance the cameras 202, 204, 206 and 210 are located in different rooms or different zones at the first user's location, then image data relating to different individuals may be captured simultaneously. Alternatively, image data relating to a particular individual may be captured at different times as that individual moves about the first user's location and passes through the FOV of the different cameras 202, 204, 206 and 210.

Referring still to FIG. 2, the system 200 further includes an image analysis server 214, such as for instance a video analytics server, which is in communication with the plurality of cameras via the communication network 212. The image analysis server 214, for instance a video analytics server, comprises a processor 216 and a data storage portion 218. Additionally, the system 200 comprises a tag 220 having a known feature 222. The known feature 222 of the tag 220 is a feature that is recognizable using an image analysis process in execution on image analysis server 214, based on image data captured using one of the cameras 202, 204, 206 and 210. Some specific and non-limiting examples of known features include, either individually or in various combinations, the color, shape, dimension, or position of the tag 220, and/or infrared or ultraviolet markings, barcodes, partec codes or other codes imprinted on the tag 220, etc. The tag 220 has associated therewith a defined image-forwarding rule. The defined image-forwarding rule is retrievably stored in the data storage device 218, in association with an identifier of the tag 220.

Optionally, the cameras 202, 204, 206 and 210 include at least one of a video camera that captures images substantially continuously, such as for instance at a frame rate of between 5 frames per second (fps) and 30 fps, and a "still" camera that capture images at predetermined intervals of time or in response to an external trigger. Some specific and non-limiting examples of suitable external triggers include detection of motion within the camera FOV and user-initiated actuation of an image capture system.

During use, the tag 220 is affixed to an individual that is to be identified within the FOV of at least one of the cameras 202, 204, 206 and 210. For instance, the tag 220 is affixed to a known human subject. The at least one of the cameras 202, 204, 206 and 210 captures image data within a known FOV thereof and provides the captured image data to the processor 216 of server 214 via the network 212. Using the processor 216, an image analysis process is applied to the captured image data for detecting therein the known feature 222 of the tag 220. When the image analysis process detects the known feature 222 of the tag 220 in the captured image data, the image-forwarding rule associated with the tag 220 is retrieved from the data storage device 218. The captured image data is then processed according to the image-forwarding rule.

In a first specific and non-limiting example, the image-forwarding rule includes a destination and an authorization for forwarding to the destination the captured image data including the known feature 222 of the tag 220. In this case, the human subject does not object to being represented in the image data that is provided to the destination, which is for instance a social networking application or another publicly accessible destination.

In a second specific and non-limiting example, the image-forwarding rule includes a forwarding criterion. For instance, the forwarding criterion comprises a time delay between capturing the image data and forwarding the image data to the destination. In this case, the human subject does not object to being represented in image data that is provided to the destination, which is for instance a social networking application or another publicly accessible destination. The human subject does however require a time delay between capturing the image data and making the image data publicly available. In this way, a celebrity such as an actor, a sports figure or a political figure may be given sufficient time to leave a particular area before the images showing the celebrity in that area become publicly available. Thus, a restaurant or another venue may provide the celebrity with a tag upon arrival, and capture promotional images while the celebrity is present. The captured images are either stored locally or provided to the destination but not made publicly accessible until after the end of the specified time delay. In this case, the restaurant or other venue is able to provide the promotional images for public viewing in a timely manner, while at the same time respecting the privacy of the celebrity. Alternatively, the time delay allows the human subject or another entity to approve/modify/reject placement of the images on the social networking application or other publicly accessible destination. In this way, unflattering images or images showing inappropriate social behavior may be removed.

Alternatively, the forwarding criterion is based on a current situation or location of the human subject that is wearing the tag. For instance, the forwarding criterion may specify that only those images that are captured in public places are forwarded, while images that are captured in private places are not forwarded.

In a third specific and non-limiting example, the image-forwarding rule comprises a forwarding denial instruction. In this case, the human subject objects to being represented in image data that is provided to the destination, which is for instance a social networking application or another publicly accessible destination. When the image-forwarding rule comprises a forwarding denial instruction, image data containing the human subject is not forwarded to a destination, such as for instance a social networking application.

Of course, other image-forwarding rules may be associated with tag 220. In addition, the system that is shown in FIG. 2 may be used in connection with other applications, such as for instance security monitoring. In this case, a tag is provided to an authorized individual, such as for instance a security guard or a building tenant. When the tag is identified within captured image data, based on a known feature thereof, a defined image-forwarding rule associated with the tag specifies that the captured image data is not to be provided to a security center as part of an alert. Optionally, the image-forwarding rule specifies additional criteria, such as for instance time periods during which the wearer of the tag is authorized to be within the monitored area. In the event one of the cameras 202, 204, 206 or 210 captures an image of the wearer of the tag outside of the authorized time periods, an alert may be sent to the security center. In another application of the system of FIG. 2, disposable clip-on tags that are issued to patrons in museums and galleries, etc. may be associated with a group or with an individual upon arrival. Image analysis of security camera image data may be used to locate a specific individual within a facility upon request, or to track the current or past movements of individuals that have become separated from their group.

In an embodiment, the image analysis server 214 is "in the cloud" and performs image analysis, such as for instance video analytics functions, for a plurality of different users including the first user. Accordingly, image data transmitted from the plurality of cameras 202, 204, 206, 210 includes a unique identifier that is associated with the first user.

In an alternative embodiment, at least some of the cameras 202, 204, 206, 210 are edge devices and include an on-board image analysis processor and a memory for storing image-forwarding rules in association with an indicator of the tag 220. Optionally, the on-board image analysis processor performs image analysis processing to detect the known feature 222 of the tag 220 therein, and then processes the captured image data in accordance with the defined image-forwarding rule.

Figure 3:
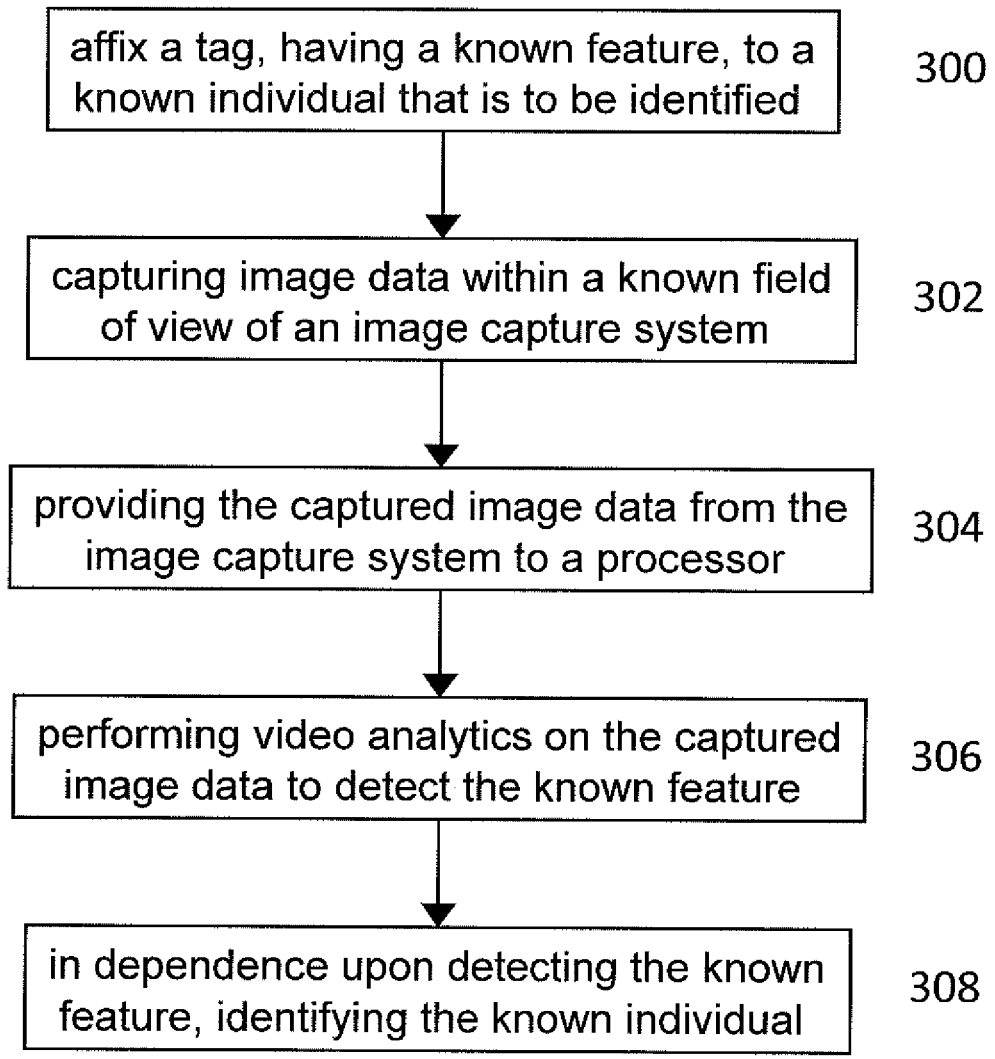
FIG. 3 is a simplified flow diagram of a method according to an embodiment of the instant invention.

Referring now to FIG. 3, shown is a simplified flow diagram of a method according to an embodiment of the instant invention. At 300 a tag is affixed to a known individual that is to be identified within a known field of view of an image capture system. In particular, the tag comprises at least a known feature, which is recognizable using an image capture system. Subsequent to affixing the tag to the known individual, image data is captured at 302. The image data is captured within the known field of view of the image capture system. At 304, the captured image data is provided from the image capture system to a processor. At 306, using the processor, image analysis is performed on the captured image data to detect the at least a known feature. At 308, in dependence upon detecting the at least a known feature, an occurrence of the known object within the captured image data is identified.

Figure 4:
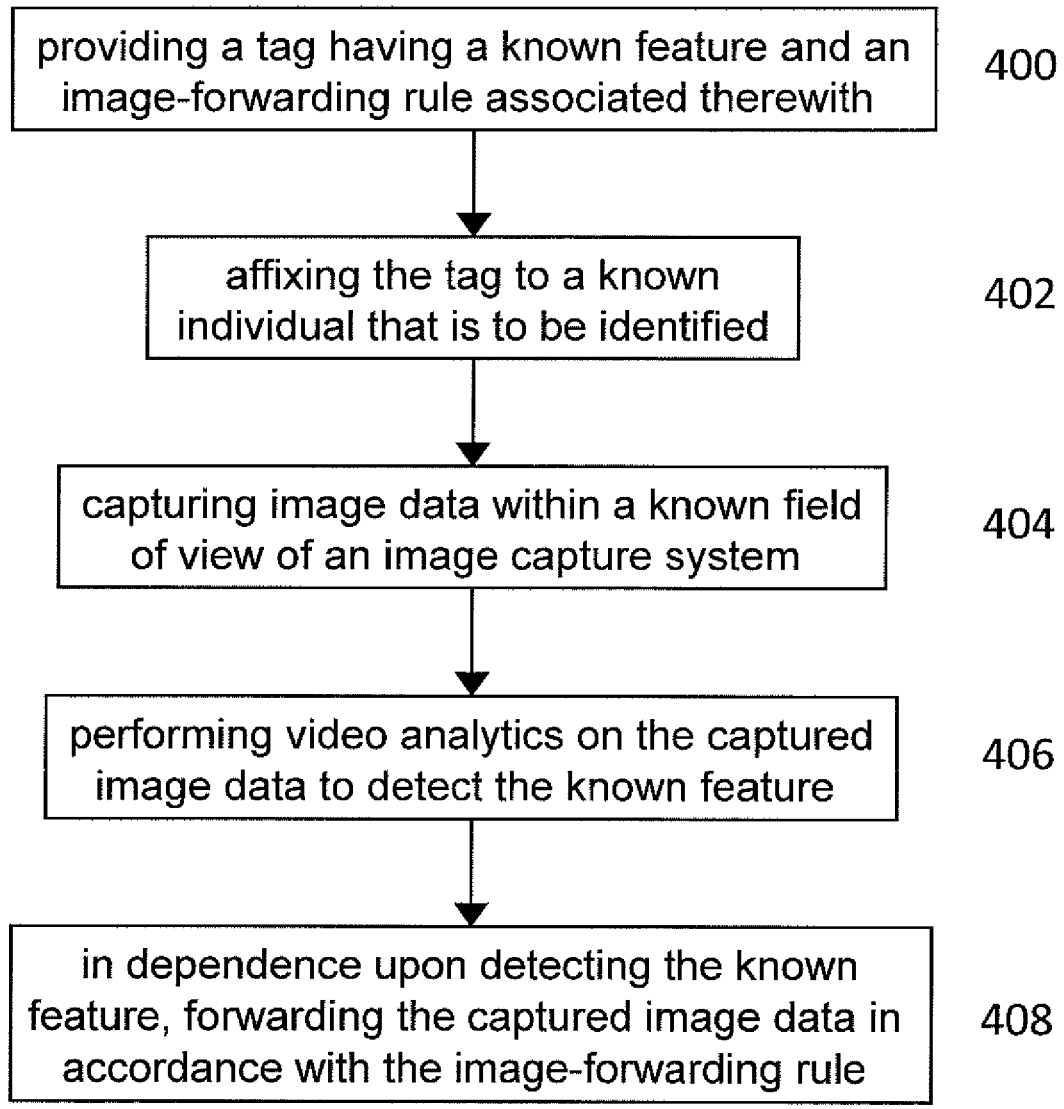
FIG. 4 is a simplified flow diagram of a method according to an embodiment of the instant invention; and, FIG. 5 is a simplified flow diagram of a method according to an embodiment of the instant invention.

Referring now to FIG. 4, shown is a simplified flow diagram of a method according to another embodiment of the instant invention. At 400 a tag is provided comprising at least a known feature, the tag having associated therewith a defined image-forwarding rule. At 402, the tag is affixed to a known individual that is to be identified within a known field of view of an image capture system. Image data is captured at 404 subsequent to affixing the tag to the known individual, the image data captured within the known FOV of the image capture system. At 406 image analysis is performed on the captured image data to detect the at least a known feature of the tag. At 408, in dependence upon detecting the at least a known feature of the tag within the captured image data, the captured image data is forwarded in accordance with the defined image-forwarding rule.

Figure 5:
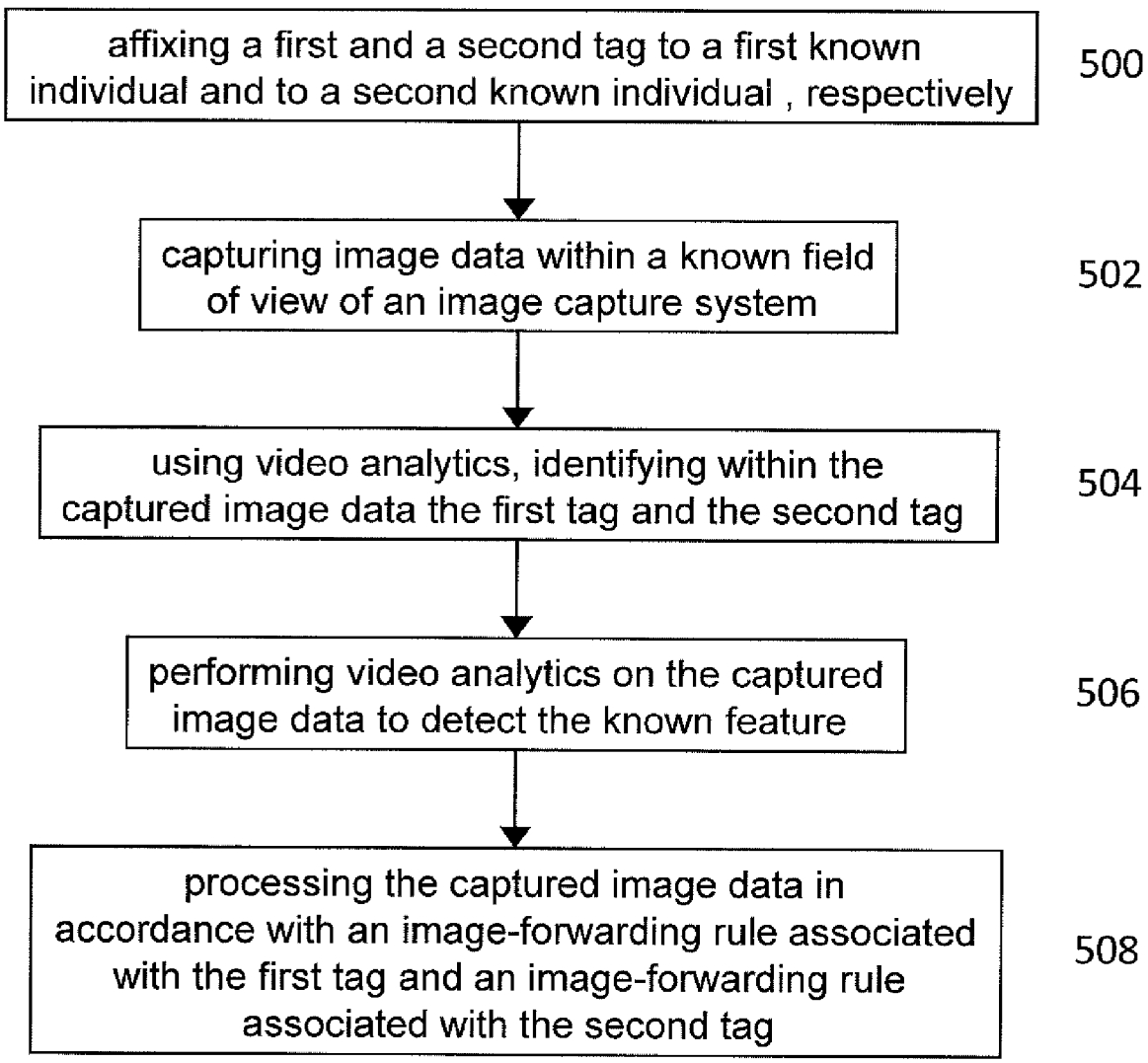

Referring now to FIG. 5, shown is a simplified flow diagram of a method according to an embodiment of the instant invention. At 500 a first tag is affixed to a first known individual and a second tag is affixed to a second known individual. The first tag comprises a uniquely identifiable first feature and the second tag comprises a uniquely identifiable second feature, and each one of the first tag and the second tag has associated therewith a predetermined image-forwarding rule. Image data is captured at 502, subsequent to affixing the first tag to the first known individual and affixing the second tag to the second known individual. In particular, the image data is captured within a known FOV of an image capture system. At 504, using image analysis, the first tag and the second tag are identified within the captured image data, based on the uniquely identifiable first feature and the uniquely identifiable second feature, respectively. At 506 the captured image data is processed in accordance with the image-forwarding rule associated with the first tag and the image-forwarding rule associated with the second tag.

According to the embodiments of the instant invention as described above, the tag is a physical object having a known feature that is recognizable, and may be affixed to another object, such as for instance a human subject, during a known period of time. Optionally, the tag is a sticker that may be affixed to a parcel or to another object that is being tracked during shipping. Optionally, the tag is a wearable item such as for instance a hat, a bracelet, a pin, etc. Optionally, the known feature is a machine-recognizable symbol such as for instance a bar code or Partec code. Optionally, the known feature is recognizable using a sensor of the image capture system that is for sensing wavelengths of light that cannot be perceived unaided by the human eye. Optionally, the tag is used to remotely identify brands or types of products. Optionally, the tag is built into a product prior to shipping.

Numerous other embodiments may be envisaged without departing from the scope of the invention.

What is claimed is:

1. A method comprising:

affixing a first tag to a first known individual and affixing a second tag to a second known individual, the first tag comprising a uniquely identifiable first feature and the second tag comprising a uniquely identifiable second feature, and each one of the first tag and the second tag having associated therewith a predetermined image-forwarding rule;

subsequent to affixing the first tag to the first known individual and affixing the second tag to the second known individual, capturing image data within a known field of view of an image capture system;

using image analysis, identifying within the captured image data the first tag and the second tag, based on the uniquely identifiable first feature and the uniquely identifiable second feature, respectively; and processing the captured image data in accordance with the image-forwarding rule associated with the first tag and the image-forwarding rule associated with the second tag, wherein processing the captured image data comprises:

cropping a first portion of the captured image data containing the first known individual when the image-forwarding rule associated with the first tag comprises a forwarding denial instruction; and forwarding to a destination a second portion of the captured image data containing the second known individual, when the image-forwarding rule associated with the second tag comprises an indication of the destination and an authorization for forwarding the captured image data to the destination.

2. A method according to claim 1, wherein using image analysis comprises performing image analysis on image data of a plurality of frames of a video data stream.

3. A method according to claim 1, wherein the destination is a social networking application.

4. A method according to claim 1, wherein the destination is one of an advertisement-placement targeting engine and a market demographic compiling engine.

5. A method according to claim 1, wherein the image capture system comprises a first image capture device and a second image capture device, and wherein capturing image data within the known field of view of the image capture system comprises capturing first image data within a first field of view of the first image capture device and capturing second image data within a second field of view of the second image capture device.

6. A method according to claim 5, wherein using image analysis comprises performing image analysis on the captured first image data and performing image analysis on the captured second image data.

7. A method according to claim 1, wherein using image analysis comprises performing image analysis on image data comprising a combination of a still image frame and a burst of video frames.

* * * * *